W. W. & R. H. HUBBELL.
Car Wheel.
No. 19,776.  Patented Mar. 30, 1858.
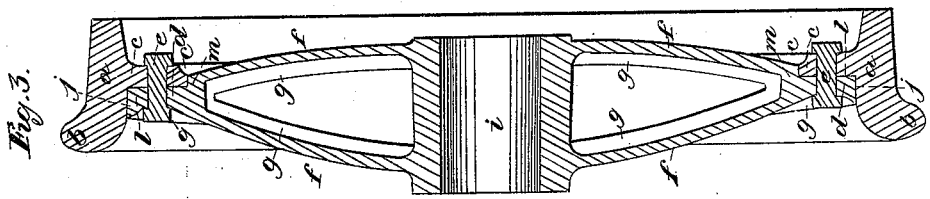
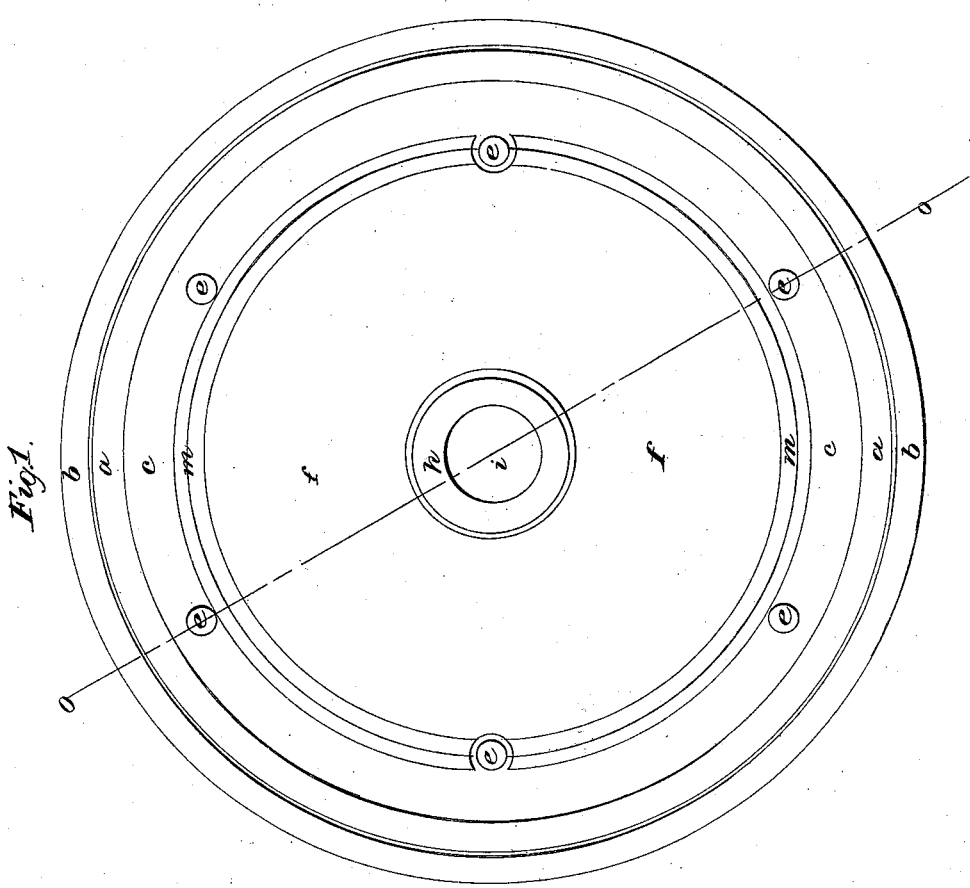
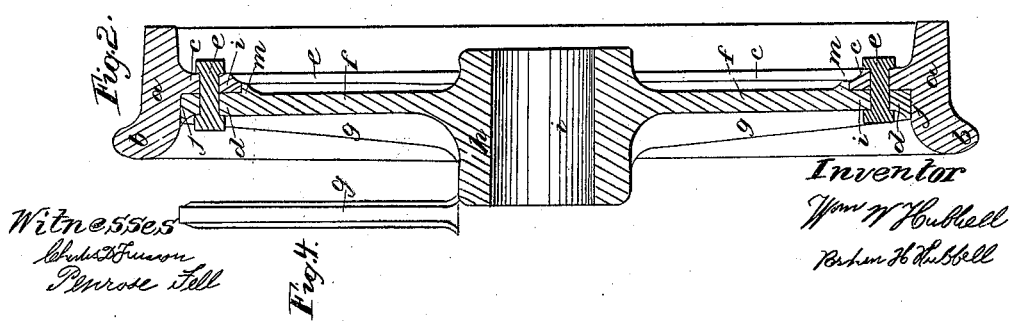
Witnesses
Inventor
Wm W Hubbell
Reuben H Hubbell

UNITED STATES PATENT OFFICE.

WM. W. HUBBELL, OF PHILADELPHIA, AND RICHARD H. HUBBELL, OF DELAWARE COUNTY, PENNSYLVANIA.

RAILROAD-CAR WHEEL.

Specification of Letters Patent No. 19,776, dated March 30, 1858.

*To all whom it may concern:*

Be it known that we, WILLIAM W. HUBBELL, of the city of Philadelphia, attorney-at-law, and RICHARD HENRY HUBBELL, of the county of Delaware, in the State of Pennsylvania, car-wheel founder, have invented a new and useful Improvement in the Chilled Cast-Iron Running-Wheels of Railroad-Cars; and we do hereby declare that the following is a full, clear, and exact description thereof, reference being had to the annexed drawings, making part hereof.

The nature of our invention consists in making an improved chilled cast iron car wheel by forming, fitting and securing together vertical circular flanges so as to bear firmly against each other, secured permanently together by red hot wrought iron rivets; one flange extending from the middle part of the inside of a chilled tread toward the center of the wheel, the other flange extending outward from the central plate or plates of the wheel inside of the other vertical flange, so that the tread and its flange receive a firm circular bearing both vertically and horizontally on the flange of the central plate without straining the rivets, and securing the parts of the wheel so firmly together as to render it capable of resisting the violent tremulous action that always is produced by the numerous shocks and high revolutions to which the small diameter, rapid speed and great weight carried by running wheels subjects them. Also in forming on the outer edge of the central vertical flange of the central plate an increased circular swell or enlargement of the horizontal bearing surface, extending back toward the running tread to increase the support to the running flange and tread throughout the entire circuit of bearing, and with radial ribs extending from said enlarged bearing alongside of the vertical flange and plate to the hub of the wheel, in order to secure the greatest strength to the tread or rim, to the plate, the vertical flange and the horizontal surface of support to the rim of the wheel, with the least proportionate weight or quantity of metal in the wheel.

We are aware that radial ribs extending from the ordinary rim to the hub have been used to strengthen the plate and rim of solid wheels; but such ribs do not form a support to the tread between the ribs, nor are they combined with an independent means of support; also they draw the chill off from the tread of the wheel. By our mode of combining them with the swell on the vertical flange, they strengthen both the side and the swell or bearing of the flange vertically and horizontally and the swelled flange thereby also forms an enlarged circular support to the tread of greatly increased strength, while the least weight of metal in proportion to such strength is used in the wheel and the metal of the ribs does not draw the chill from the tread of the wheel.

We are also aware that suggestions have been made and applications for patents been made and withdrawn or abandoned, proposing to form a cast iron wheel with vertical flanges, cast with lugs or clutches thereon intended to fit together and be secured by screw bolts, the clutches to prevent the rim from rotating or working on the center plate; but therefore not being circular so as to be turned and fitted firmly to receive all the bearing and strain on the faces of the flanges, and none on the bolts; and being provided with screw bolts, therefore, without such firm and necessary means of securing the flanges as to hold firm and not work loose under the violent tremor of a running wheel in action, and being intended simply to be fitted by casting without reference made to the chilling or effects of chilling, and no adaptation to being turned off to remedy the defects of chilling; containing therefore no provision for such close and firm contact of the flanges without strain on the securing bolts; notwithstanding the fact that when the rim is chilled, its size varies with different kinds of iron, different runs of the same iron, different degrees of the heat of the iron when poured, different degrees of temperature of the chills, and other causes which vary the chill and shrinkage and size of the rim, and render a uniform and close bearing and firm fitting of the flanges by casting alone, impracticable for the service required of a safe and economical running wheel.

We are also aware that similar abandoned or withdrawn suggestions have been made, to make a wrought iron wheel, with solid hub and plate, secured by rivets to a flange inside of the wrought rim adapted to the curvature or set of the central dished plate;

depending upon the pliability of the wrought iron to make a fit; describing no means or manner by which such solid hub and plate and rim are to be made of wrought iron, and not depending on red hot rivets to secure the necessary firmness of contact that exists in our wheel, and not having bearing faces adapted to the kind of metal, form and manner of obtaining the bearing faces and securing the same, necessary to the practical operation of our chilled cast iron wheel. In short, the chilling of the rim and its effects on the degrees of shrinkage and size; the manner of forming and working the bearing faces vertical and horizontal, circular (without clutches) to obtain the essential bearings notwithstanding the counteracting effects of the unequal shrinkage of chilling; and the firm securing of these unyielding cast iron faces to each other by the pliant and self adjusting yet solid and permanent fixture of red hot rivets, are most important and essential elements to produce the practical running wheel of our invention, it being light, strong, durable, safe and economical to a superior degree.

In the accompanying drawings making part of this specification, Figure 1, exhibits a view of the outside of our wheel, Fig. 2, a sectional view of the same on the line "o, o", Fig. 4, a back view of one of the supporting ribs to the plate and swelled flange, in which like letters refer to like parts.

"a"— is the rim or tread, "b"— is the running flange, "c"— is the circular vertical flange to the rim fitting tightly against the vertical circular flange "d" of the center plate, and bearing on the same against the faces "j"—"l" and "m", secured firmly thereto by the wrought iron rivets "e"—"e" fastened in position when red hot, so that they shall adapt themselves in this state to the holes and the rigid nature of the cast iron flanges and by their shrinkage bind the faces of the cast metal very firmly and permanently together to resist the tremor of the wheel.

"f"— is the central plate extending from the solid hub cast therewith, and forming on its outer face a vertical flange with enlarged horizontal bearing surface "j"— sustaining the rim; the hub plate and enlarged face being strengthened and sustained by the assistance of radial ribs —"g", between the rivets, forming a light yet very strong structure, notwithstanding the separable nature of the rim of the wheel, "h"—is the hub, and "i"—the center of the wheel.

The central portion of the wheel consisting of the hub plate or plates ribs and the swelled vertical flange should be cast in one piece of soft tough iron to attain great strength with lightness of metal. The rim should be cast of the usual metal more suitable for obtaining a good chill on the tread, and the rivets should be of the toughest wrought iron. When the rim and central part of the wheel are cast, the flanges thereto being circular with vertical and horizontal faces, without lugs or clutches projecting therefrom to interfere with the tool in a lathe, are set on a lathe with turning tools set to a fixed gage, the rim is held by the tread and the center is held by bolts through holes in the plate made for the purpose, and the bearings are turned off to fit firmly together, (and also the axle center may be bored out) notwithstanding the unavoidable irregular shrinkage and size in casting and chilling, and are thereby adapted to give the bearing to the tread, firm and without strain on the rivets, so essential to prevent the parts from working loose when subjected to the jars and vibrations in running.

The tread may be warmed to a heat of about 150° when pressed on the center, so that it may shrink tightly to it, and there it is secured by the pliant self adjusting nature of red hot rivets headed up and holding it tight and firm when they are cold, without danger of working loose, or yielding under the tremor of rapid running, forming a most complete strong, durable and economical chilled cast iron car wheel. When this tread is worn out from use, the rivets may be cut off, and a new rim turned off to the same gage or size, fitted on and secured with new red hot rivets, forming a cheap renewal and again a durable wheel. Both the center and rim of this wheel are free from the strain now experienced from the shrinkage of chilling, while its form, mode of fitting and structure, render it quite as solid a wheel as those now cast in one piece, while the chilling is deeper, harder and better, and the wheel from the kind of iron that can be used and the absence of strain, is much stronger.

Two of the rivets "e" are inserted through one of the bearing joints "m" as shown in Fig. 1, and there serve both the double purpose of clenching the flanges together and keying the joint. The other parts of this bearing "m" between the sockets of the rivets may be dispensed with, but the bearing "l" is important and is vertical, and also the outer bearing surface "j," which is horizontal.

Fig. 3, is a sectional view, showing the central plate formed double, or of two plates "f f" with the radial ribs half round "g g" extending from the hub inside of the plates and then extending on the outside at "g" between the back plate and rim, supporting the vertical flange and its enlarged face "j." In this figure like letters refer to like parts as in the other figures. But a few rivets are required in this construction, six, eight or ten are sufficient.

What we claim as our invention is—

1. The circular vertical flanges of the rim and plate cast separately turned off smooth and fitted together substantially as described.

2. Also the central plate strengthened with ribs and made thicker around its outer edge where it is secured to the rim in combination with the vertical flanges on the rim and plate substantially as described.

WM. W. HUBBELL.
RICHARD H. HUBBELL.

Witnesses:
CHARLES D. FREEMAN,
PENROSE FELL.